United States Patent [19]

Gunderson

[11] Patent Number: 5,485,982
[45] Date of Patent: Jan. 23, 1996

[54] QUICK CONNECTOR WITH TUBE ACTIVATED CHECK VALVE

[75] Inventor: Stephen H. Gunderson, Marine City, Mich.

[73] Assignee: Bundy Corporation, Warren, Mich.

[21] Appl. No.: 307,378

[22] Filed: Sep. 16, 1994

[51] Int. Cl.$^6$ .................................................. F16L 37/00
[52] U.S. Cl. ............................ 251/149.6; 251/149.1; 285/319
[58] Field of Search ......................... 251/149.1, 149.6, 251/149.9; 285/319, 320, 316, 315

[56] References Cited

U.S. PATENT DOCUMENTS

| | | |
|---|---|---|
| 1,984,328 | 12/1934 | Bechtold . |
| 2,322,877 | 6/1943 | Parker . |
| 2,905,485 | 9/1959 | Zajac . |
| 3,177,018 | 4/1965 | Goodwin . |
| 3,567,175 | 4/1971 | Sciuto . |
| 3,601,361 | 8/1971 | Hundhausen et al. . |
| 3,861,645 | 1/1975 | Norton . |
| 3,873,062 | 3/1975 | Johnson et al. . |
| 4,060,219 | 11/1977 | Crawford . |
| 4,311,328 | 1/1982 | Truchet . |
| 4,436,125 | 3/1984 | Blenkush . |
| 4,612,953 | 9/1986 | Carroll et al. . |
| 4,613,112 | 9/1986 | Phlipot et al. . |
| 4,664,420 | 5/1987 | Demeri . |
| 4,683,905 | 8/1987 | Vigneau et al. . |
| 4,768,933 | 9/1988 | Stachowiak . |
| 4,792,115 | 12/1988 | Jindra et al. . |
| 4,819,908 | 4/1989 | Norkey . |
| 4,905,964 | 3/1990 | Shiozaki . |
| 4,936,345 | 6/1990 | Nix ...................................... 285/320 X |
| 5,107,890 | 4/1992 | Gute . |
| 5,273,254 | 12/1993 | McNaughton et al. . |

FOREIGN PATENT DOCUMENTS

| | | |
|---|---|---|
| 1285851 | 1/1962 | France . |
| 1675178 | 1/1968 | Germany . |

*Primary Examiner*—John Rivell
*Assistant Examiner*—Kevin L. Lee
*Attorney, Agent, or Firm*—Dorn, McEachran, Jambor & Keating

[57] ABSTRACT

A quick connector coupling for forming a joint in a fluid line system comprises a female connector body having a bore which receives a male member. A retainer disposed within the bore includes retention legs having members which extend between abutment surfaces formed within the connector body and an upset formed on the male member to retain the male member within the bore. A tube activated check valve disposed within the bore permits two-directional flow through the coupling when the male member has been inserted to a sealed position, and checks flow through the coupling when it is unsealed.

19 Claims, 5 Drawing Sheets

QUICK CONNECTOR WITH TUBE ACTIVATED CHECK VALVE

FIELD OF THE INVENTION

This invention relates to fluid line systems which include quick connector couplings, and more particularly to a quick connector coupling having a tube activated check valve which allows two-directional flow when activated.

Cross-Reference

This application is related to a copending United States patent application, filed on even date herewith, entitled "Quick Connector with Pull Back Verification Method", having common inventor and assignee of interest.

BACKGROUND OF THE INVENTION

In automotive and other fields, quick connector couplings are often utilized to provide a fluid connection between two components or conduits, thus establishing a fluid line between the two components, usually a rigid tube and a system element contained within a metal housing. Use of quick connector couplings is advantageous in that a sufficiently sealed and secured fluid line may be established with a minimum amount of time and expense.

Check valves are traditionally pressure, rather than tube, activated. A pressure activated check valve is illustrated in U.S. Pat. No. 5,107,890, to Gute. Pressure activated check valves allow flow only in one direction. One-directional flow may be preferable and even necessary in some systems. Pressure activated check valves are thus suitable and perhaps desirable for use in such systems. In systems where two-directional flow is desired, however, a pressure activated check is not sufficient.

Tube activated check valves typically permit two-directional flow through a coupling. Examples of tube activated check valves are found in U.S. Pat. No. 5,273,254, to McNaughton, and in U.S. Pat. 4,936,544 to Bartholomew. Prior tube activated valves, while permitting bi-directional flow, have not always reliably checked flow when the coupling is in an unsealed state.

A need exists for a tube activated check valve which permits two-directional fluid flow when the coupling is sealed, that is, when a tube is present, but reliably checks flow through the coupling when the coupling is unsealed, that is, when a tube is not present. The check valve of the present invention addresses this need.

SUMMARY OF THE INVENTION

The present invention provides a quick connector coupling having a tube activated check valve permitting two-directional flow through the coupling when it is sealed.

The coupling includes a female connector body defining a bore which extends axially inwardly into the connector body from an entrance. A radial rim formed in the connector body adjacent the entrance defines an interior abutment surface. A male member is received within the bore of the connector body and has an enlarged upset portion.

A retainer is disposed within the bore of the connector body. It includes retention legs which have members that extend between the upset portion of the male member and the interior abutment surface to retain the male member within the bore.

A check valve is also disposed within the bore of the connector body. It includes a guidance sleeve fit within the bore. A valve seat is formed on the guidance sleeve. The check valve also includes a plunger movable within the guidance sleeve. A valve seal on the plunger is engagable with the valve seat. The plunger is movable within the guidance sleeve from a checked position, wherein the valve seat contacts the valve seal, to an unchecked position, wherein the valve seat is separated from the valve seal.

BRIEF DESCRIPTION OF THE DRAWINGS

FIG. 6 is a sectional view of a second embodiment of a quick connector coupling according to the present invention.

DETAILED DESCRIPTION OF PREFERRED EMBODIMENTS

Figure 1:
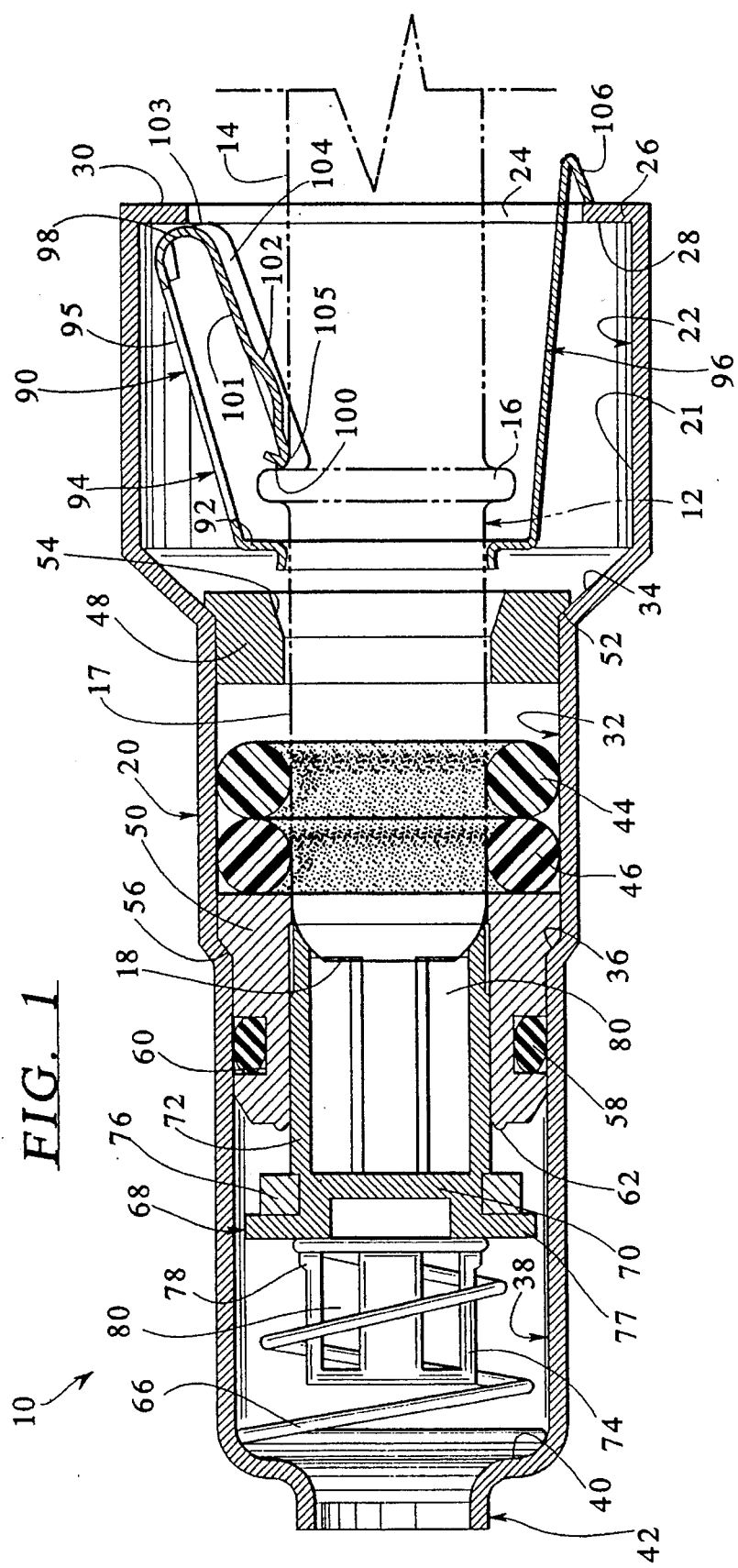
FIG. 1 is a partial sectional view of a quick connector coupling which embodies the present invention, shown in a fully assembled position.

A quick connector coupling formed in a fluid line system is designated as 10 in FIG. 1. Quick connector coupling 10 is comprised of a female connector body 20 and a male member 12 formed at an end of a tube 14 which forms a part of a fluid line system. In use, connector body 20 is, in turn, connected to flexible tubing (not shown) which is also a component of the fluid line system. Female connector body 20 and male member 12 are connectable to form a permanent, but severable, joint.

Female connector body 20 is hollow and defines an axial bore 21 extending inwardly from an entrance 24. Connector body 20 is preferably made of a metallic material, such as stainless steel. Entrance 24 is defined by a radial annular rim 26, which in turn defines an interior abutment surface 28 and an exterior abutment surface 30. Enlarged retainer housing portion 22 is formed in connector body 20 inwardly of rim 26.

Seal housing portion 32 is formed in connector body 20 inwardly of retainer housing portion 22. Seal housing portion 32 is of reduced diameter relative to retainer housing portion 22 and extends between a first conical shoulder 34 adjacent retainer housing portion 22 and a second conical shoulder 36 remote from retainer housing portion 22.

Check valve housing portion 38 is formed in connector body 20 inwardly of seal housing portion 32. Valve housing portion 38 is of reduced diameter relative to seal housing portion 32 and extends between second conical shoulder 36 and an annular spring seating surface 40.

Tubing connection portion 42 is formed at an end of connector body 20 remote from entrance 24. Connection portion 42 is only partially illustrated in FIG. 1. Typically, barbs will be formed in its exterior to facilitate connection to flexible tubing and an open end will provide communication with the flexible tubing. Connection portion 42 could be configured in alternative ways for connection to other system arrangements. For example, threads could be formed in its outer periphery to facilitate connection within a threaded bore of a housing containing a system component.

Male member 12 is received within connector body 20 and includes an enlarged upset 16 formed a given distance from an open end 18. Open end 18 is in fluid communication with bore 21 of connector body 20. A cylindrical surface 17 extends between upset 16 and end 18. Male member 12 is typically formed at the end of a rigid, metal tube 14.

Disposed within seal housing portion 32 are an outer annular "O" ring seal 44 and an inner annular "O" ring seal 46. "O" ring seals 44 and 46 surround male member 12, forming a fluid-tight seal between cylindrical surface 17 of male member 12 and seal housing portion 32 of connector body 20. "O" ring seals 44 and 46 are secured within bore 21 between outer spacer 48 and check valve guidance sleeve 50. Outer "O" ring seal 44 is preferably made of toughened fluorosilicone and inner "O" ring seal 46 is preferably made of a fluorosilicone-fluorocarbon blend.

Spacer 48 and sleeve 50 also surround male member 12, having inner diameters just slightly larger than the outer diameter of cylindrical surface 17 of male member 12. Spacer 48 and check valve sleeve 50, preferably made of 23% glass-filled nylon-12, fit tightly and snugly within bore 21. Outer spacer 48 includes a conical seat 52 which seats against conical shoulder 34 of connector body 20 to position spacer 48 within bore 21. Spacer 48 also includes a chamfered guide portion 54 to assist and guide the insertion of male member 12.

Check valve sleeve 50 extends into check valve housing portion 38 of connector body 20 and includes a conical seat 56 which seats against second conical shoulder 36 to position sleeve 50 within bore 21. A third annular "O" ring 58 is disposed in a groove 60 formed in the exterior of sleeve 50. "O" ring 58 provides a fluid seal between sleeve 50 and check valve housing portion 38. It is preferably made of a fluoroelastomer, such as fluoroelastomers manufactured under the trademark "Viton". A ring-shaped valve seat 62 is formed on the innermost end of inner spacer 50.

A spring 66 and a plunger 68 are also disposed in check valve portion 38 of connector body 20. Spring 66 is preferably formed of stainless steel and plunger 68 is preferably formed of 23% glass-filled nylon-12. Plunger 68 comprises a solid central portion 70, a hollow outer cylindrical portion 72 extending outwardly from central portion 70 and into sleeve 50, and a hollow inner cylindrical portion 74 extending inwardly from central portion 70. A seal in the form of a "O" ring 76 surrounds, and is retained on, central portion 70 between a flange 77 and outer cylindrical portion 72. "O" ring 76 has a square cross-section and is preferably made of a high fluorine fluoroelastomer, such as fluoroelastomers manufactured under the trademark "Viton". The outer diameters of seal 76 and flange 77 are less than the inner diameter of check valve housing portion 38, allowing fluid to flow around central portion 70 of plunger 68.

Spring 66 is conically-shaped, extending between a larger diameter end which seats against spring seating surface 40 of connector body 20, and a smaller diameter end which surrounds inner cylindrical portion 74 of plunger 68. The smaller diameter end of spring 66 is retained on inner cylindrical portion 74 between flange 77 of central portion 70 and a barb 78 formed on the exterior of inner cylindrical portion 74.

Axially-extending windows, or cut-out portions, 80 extend through cylindrical portions 72 and 74 of plunger 68. When coupling 10 is fully assembled, as in FIG. 1, the check valve is open and permits fluid flow through the coupling. End 18 of male member 12 contacts the open end of outer cylindrical portion 72 of plunger 68, pushing plunger 68 inwardly and compressing spring 66. Windows 80 of cylinder 72 extend beyond sleeve 50, permitting fluid communication between male member 12 and tubing connection portion 42 of connector body 20.

Figure 3:
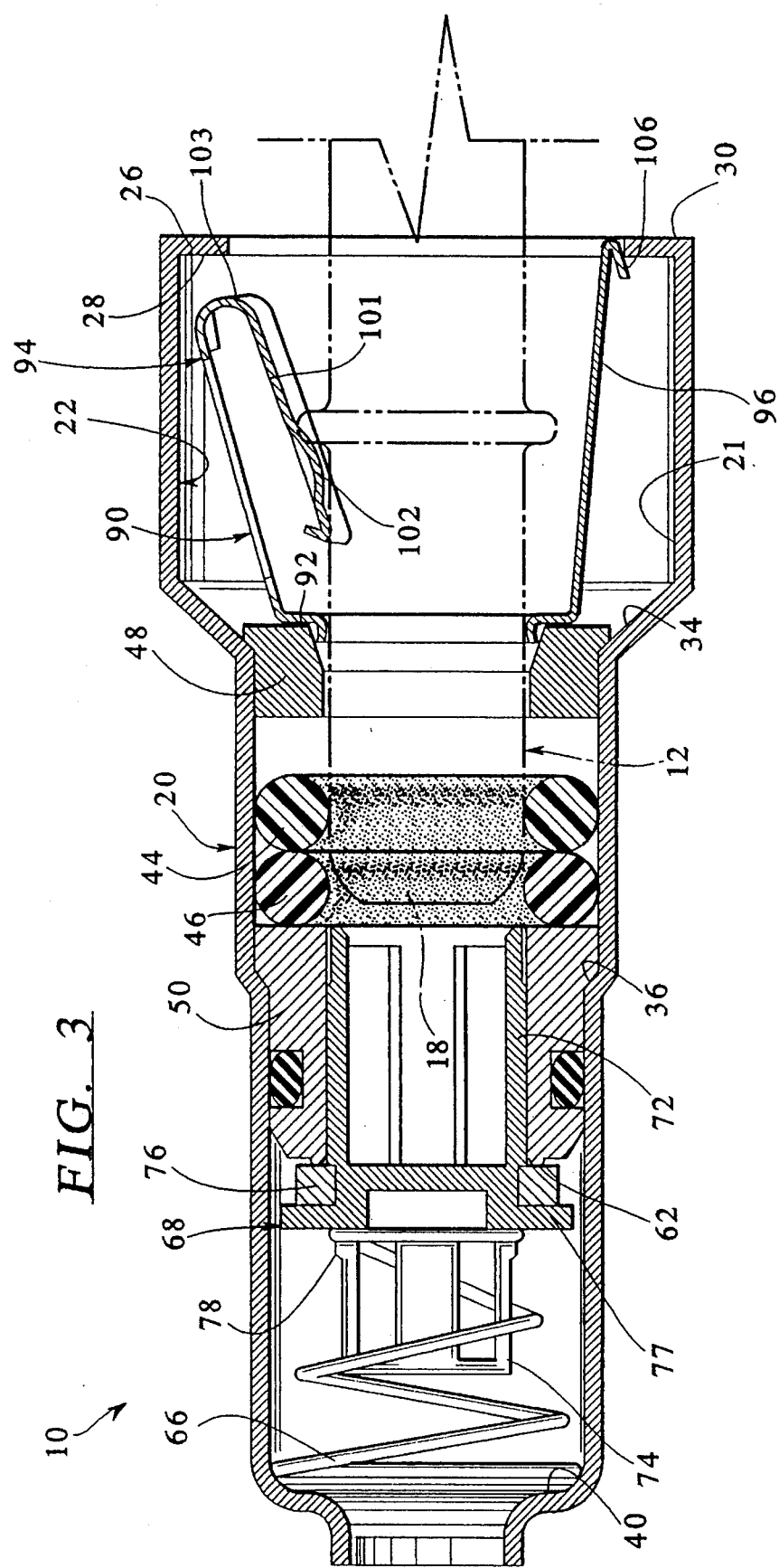
FIGS. 3–5 are a series of partial sectional views illustrating assembly steps for the quick connector coupling depicted in FIG. 1.

When coupling 10 is disconnected, as in FIG. 3, the check valve is closed and does not permit fluid flow through the coupling. End 18 of male member 12 does not contact the open end of plunger cylindrical portion 72. Spring 66 expands, pressing seal 76 against valve seat 62 formed on sleeve 50 and effectively cutting off the fluid flow path through the coupling.

Figure 2:
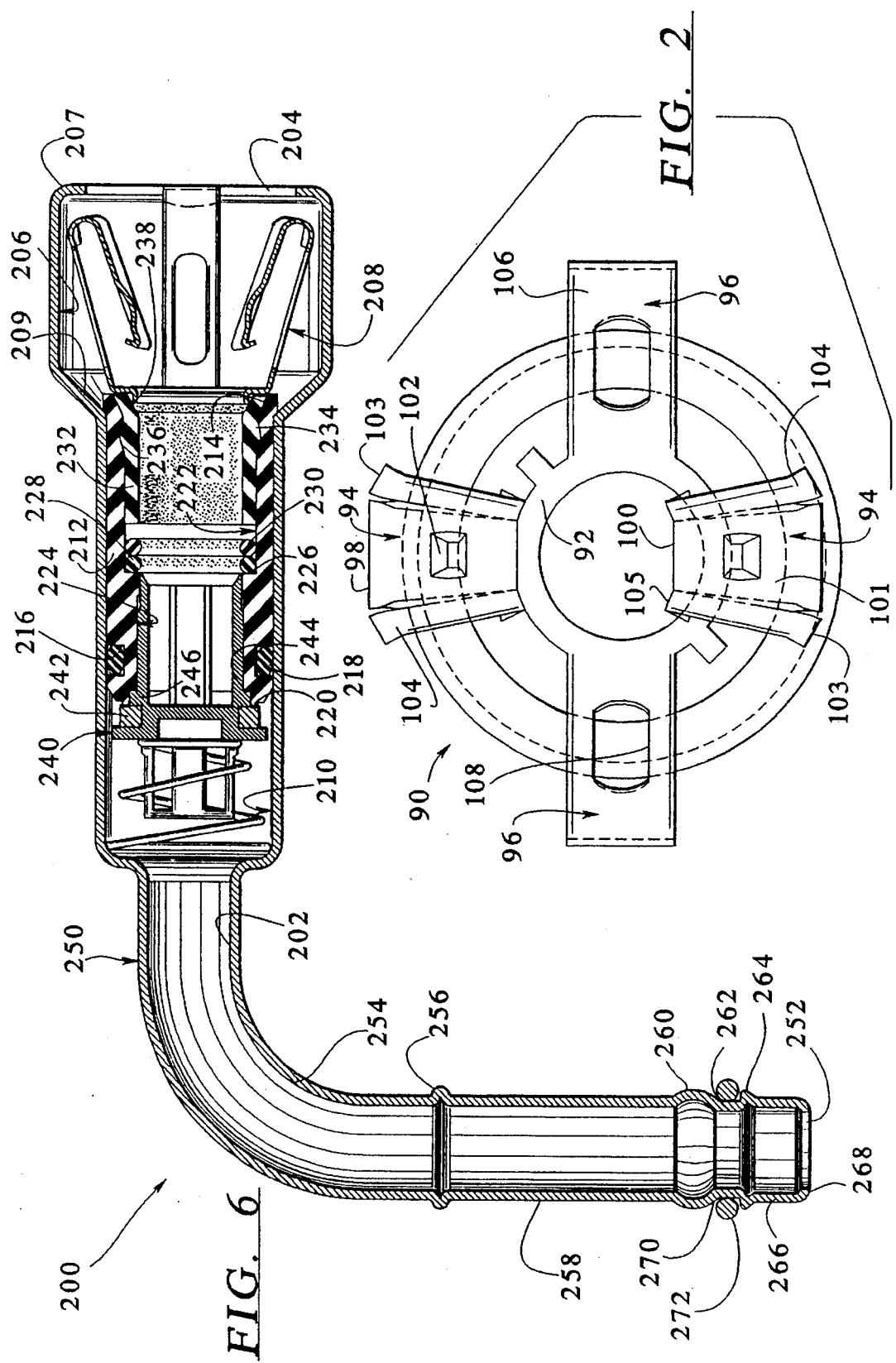
FIG. 2 is front elevation view of a pull back retainer which is a part of the quick connector coupling of FIG. 1.

A pull back retainer 90, illustrated in more detail in FIG. 2, is disposed within retainer housing section 22 of connector body 20. Retainer 90 is preferably made of a metallic material, such as stainless steel.

Retainer 90 includes a hollow, annular ring 92 which surrounds male member 12. Ring 92 has an interior diameter which is approximately the same as the exterior diameter of cylindrical surface 17 of male member 12. Four legs are spaced equidistantly about the circumference of ring 92: a pair of 180 degree opposed retention legs 94 and a pair of 180 degree opposed latching verification legs 96. In FIGS. 1 and 3–5, a latching verification leg is shown 90 degrees out of alignment so that both legs may be illustrated.

Each retention leg 94 includes a support member 95, a retaining member 101 and two wings 104. Support members 95 extend away from ring 92 to first bends 98. Legs 94 reverse direction at bends 98. Retaining members 101 continuous with support members 95 extend from bends 98 back toward ring 92 to second leg bends 100. Bends 100 are spaced from ring 92 and contact upset 16 to secure male member 12 in connector body 20. Retaining members 101 are positioned "underneath" support members 95. Ramped bumps 102 may be formed on retaining members 101 to provide enhanced stiffness to members 101 and enhanced resistance to insertion of male member 12.

Wings 104 extend circumferentially from the lateral edges of retaining members 101. They extend between an outer wing bend 103, remote from ring 92, and an inner wing bend 105, adjacent second leg bends 100.

Wings 104 extend to a position more remote from retainer ring 92 than do retaining members 101. Stated another way, wing bends 103 are spaced further from ring 92 than are leg bends 98. Thus, in operation, outer wing bends 103 contact interior abutment surface 28 defined by annular rim 26 of connector body 20 to secure retainer 90 within bore 21. Leg bends 98 are held out of contact with body 20 during normal operation. Inner wing bends 105 contact upset 16 to assist second leg bends 100 in retaining male member 12 within connector body 20.

Latching verification legs 96 extend axially and radially outwardly of retainer ring 92 to latches 106. Apertures 108 may be formed in legs 96 to facilitate use of a tool to install retainer 90. When fully assembled, as shown in FIG. 1, latches 106 are positioned outwardly of entrance 24 and engage exterior abutment surface 30 defined by rim 26 of connector body 20. The method by which latches 106 arrive at this position is a very important part of the present invention, and is described in detail below. Verification legs 96 serve two functions: (1) they provide a visual indication that a proper coupling has been achieved; and (2) they prevent inward axial displacement of retainer 90.

Prior to insertion of male member 12 into connector body 20, the check valve, seal and retainer elements are installed in connector body bore 21. Spring 66 is inserted into bore 21 and seated against seating surface 40. Plunger 68, with square cross-sectioned "O" ring 76 fitted on, is then inserted until spring 66 snaps into place around inner cylindrical portion 74 between barb 78 and flange 77 of central portion 70. Next, check valve sleeve 50 is fit into bore 21 against second conical shoulder 36. "O" rings 44 and 46 are inserted to rest against spacer 50. Outer spacer 48 is then fit against first conical shoulder 34 to secure the "O" rings in place.

Finally, retainer 90 is inserted into retainer housing portion 22. Legs 94 and 96 are flexed inwardly to clear rim 26 and gain entry into bore 21. An installation tool having prongs may be used in conjunction with apertures 108 formed on latching verification legs 96 to assist in this endeavor. Retainer 90 should be initially inserted into bore 21 as far as possible—until ring 92 abuts outer spacer 48. In this initial position (FIG. 3), outer wing bends 103 will be spaced inwardly from interior abutment surface 28, and latches 106 of latching verification legs 96 will be spaced inwardly of exterior abutment surface 30 and in radial alignment with rim 26.

Figure 4:
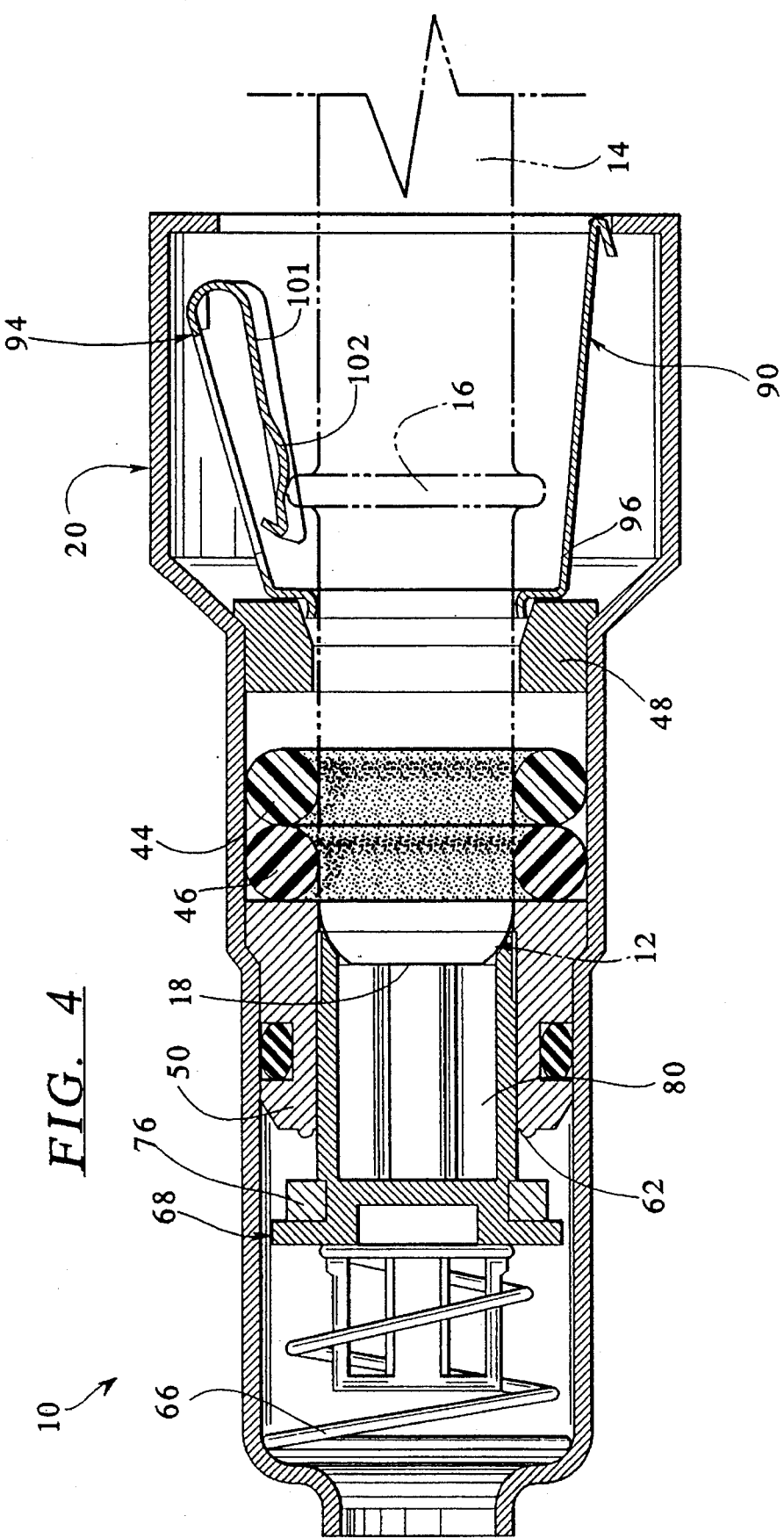
Figure 5:
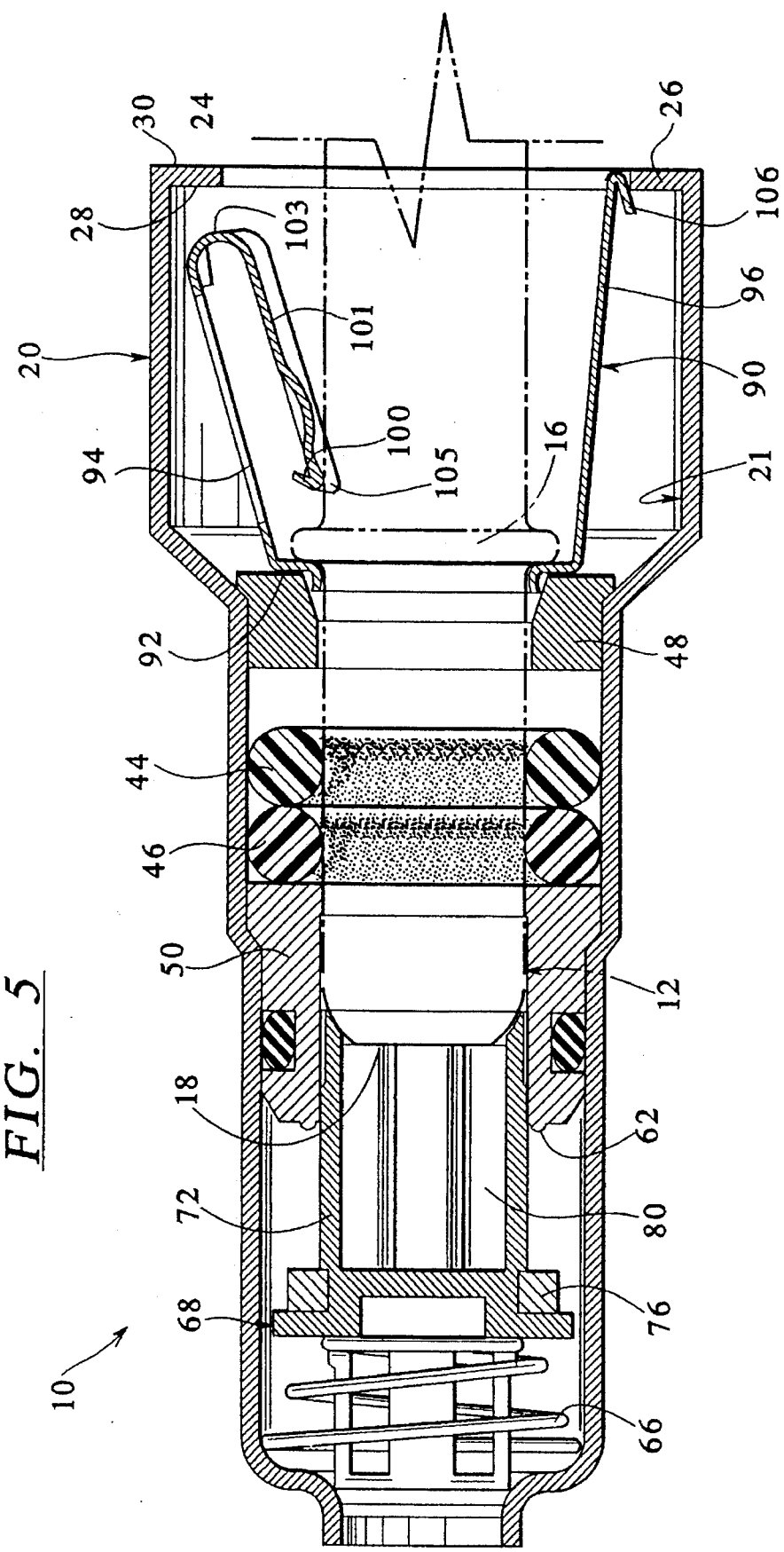

FIGS. 3–5 illustrate the steps in installation leading to the fully assembled coupling of FIG. 1. In FIG. 3, insertion of male member 12 has begun but open end 18 has not yet reached outer cylindrical portion 72 of plunger 68. Until end 18 of member 12 contacts plunger 68 and pushes it forward, coupling 10 remains in a checked position as illustrated in FIG. 3.

In FIG. 4, male member 12 has been inserted such that upset 16 has moved axially inwardly of bumps 102 formed on retention leg members 101. Initially, leg members 101 resist insertion of male member 12. Bumps 102 enhance this resistance. With application of sufficient force, however, leg members 101 flex outwardly to allow passage of upset 16. Once upset 16 has passed bumps 102, resistance to inward insertion diminishes significantly.

Also in FIG. 4, tube end 18 has moved past "O" ring seals 44 and 46 to contact plunger 68. Plunger 68, guided by sleeve 50, is moved axially inwardly. The guidance provided by sleeve 50 is important as radial instability of plunger 68 could cause leakage and/or breakdown of the check valve. Spring 66 is compressed in response to inward movement of plunger 68. Seal 76 is unseated from valve seat 62 and windows 80 are exposed to bore 21. Thus, two-directional flow through the coupling may occur. It is important to note that no flow through coupling 10 occurs until tube end 18 has moved fully past "O" ring seals 44 and 46, fully sealing coupling 10.

Latching verification legs 96 have a greater internal diameter than the external diameter of upset 16. Thus, the presence of legs 96 does not hinder or affect insertion of male member 12. Likewise, inward insertion of male member 12 does not affect or change the position of legs 96. In the assembly steps illustrated in FIGS. 3 and 4 the position of legs 94 changes (they have flexed outwardly) while the position of legs 96 remains unchanged.

In FIG. 5, male member 12 has been inserted to a maximum inward axial position. Upset 16 abuts retainer ring 92 which, in turn, abuts outer spacer 48 to prevent further insertion of male member 12. End 18 of member 12 has moved plunger 68 to a fully open position. Seal 76 is separated from valve seat 62 and windows 80 of outer cylindrical portion 72 are fully exposed to bore 21. Retention leg members 101 have snapped back into place outward of upset 16. The position of latching verification legs 96, however, remains unchanged.

The final assembly step consists of "pulling back" on male member 12 until upset 16 abuts second bends 100 of retention legs 94 and inner wing bends 105. As male member 12 is pulled back further, the contact between second bends 100 and upset 16 causes outward axial displacement of retainer 90 until outer wing bends 103 contact interior abutment surface 28 of connector body 20. At this point, male member 12 cannot be pulled back any further, providing a physical verification of a proper coupling.

When male member 12 has been pulled back in this manner, latching verification legs 96 are displaced outwardly along with retainer 90. This motion leads to the fully assembled position shown in FIG. 1. The check valve remains open even after the pull-back operation. As shown, latches 106 move outwardly of entrance 24 to wrap around rim 26 and engage exterior abutment surface 30 of connector body 20. Thus, a proper coupling may be visually verified by the presence of latches 106. Latches 106 are of functional significance as well—the engagement of latches 106 with exterior abutment surface 30, in conjunction with the engagement of outer wing bends 103 with interior abutment surface 28, fixes the axial position of retainer 90.

The chances of an assembler skipping or missing the coupling verification step are decreased, since the step has functional merits as well. The pull back operation, in addition to providing a visual verification of the coupling, actually adds strength to the coupling. Thus, it is a necessary step in achieving a proper coupling rather than solely a verification step which may be skipped without detection.

A female connector body portion of a quick connector coupling representing a second embodiment of the present invention is designated as 200 in FIG. 6. Female connector body 200 is similar to female connector body 20, but contains several differences and modifications. For sake of brevity, only the differences between the two embodiments are discussed at length.

Connector body 200 is hollow, defining a bore 202. Bore 202 extends into connector body 200 from an entrance 204. An enlarged retainer housing portion 206, defined by a radial rim 207 and a conical shoulder 209, is formed in connector body 200 adjacent entrance 204 and houses a retainer 208. These features are essentially the same as the corresponding features in the first embodiment connector body 20.

The first embodiment connector body 20 defines a seal housing portion 32 and a check valve housing portion 38, with check valve housing portion 38 being of reduced diameter relative to seal housing portion 32. The diameter reduction is necessary to provide a seat for check valve guidance sleeve 50. Second connector body embodiment 200 differs, providing a combined seal/check valve housing portion 210 of consistent diameter.

An elongated check valve sleeve 212 is fit into seal/check valve housing portion 210. Check valve sleeve 212 extends into retainer housing portion 206 of connector body 200 and includes a conically enlarged end 214 which seats against conical shoulder 209 to position sleeve 212 within bore 202. As in the first embodiment sleeve, sleeve 212 includes an exterior groove 216 housing an annular "O" ring 218, and an annular ring 220 surrounding the inner end of sleeve 212.

Sleeve 212 is hollow, defining an enlarged diameter seal housing portion 222 and a reduced diameter plunger guidance portion 224. Annular shoulder 226 separates seal housing portion and plunger guidance portion 224.

An inner annular "O" ring 228, preferably formed of a fluorosilicone-fluorocarbon blend, and an outer annular "O" ring 230, preferably formed of toughened fluorosilicone, are seated in seal housing portion 222 of sleeve 212 adjacent annular shoulder 226. A spacer 232 fit into sleeve 212 secures "O" rings 228 and in place. Spacer 232 includes an annular exterior protrusion which is received in a depression 236 formed in the interior of sleeve 212 to position spacer 232 within sleeve 212. End 238 of spacer 232 is conically enlarged and seats against sleeve end to limit inward insertion of spacer 232.

A spring-loaded plunger 240 is movable within plunger guidance portion 224 of sleeve 212. As in the first embodiment, a square cross-sectioned "O" ring 242 seats against sleeve ring to check flow when connector body 200 is not sealingly connected to a male member. An inwardly facing annular shoulder formed in the interior of plunger guidance portion 224 of sleeve 212 cooperates with an outer flange 246 formed on plunger to limit insertion of plunger 240 into sleeve 212.

A tubing connection portion 250 is formed at an end of connector body 200 remote from entrance 204. Connection portion is continuous with seal/check valve housing portion 210 and extends to an open end 252. Open end 252 provides communication with flexible tubing (not shown) which is connected to connection portion 250.

The exterior of connection portion 250 is configured to provide enhanced securement of a flexible hose to connector body 200. A first cylindrical wall 254 extends from housing portion 210 to a first upset 256. A second cylindrical wall 258 extends from first upset 256 to a bulge 260. The outer diameters of first cylindrical wall 254 and second cylindrical wall 258 are equal. In operation, upset 256 expands the flexible hose secured on connection portion 250 to provide enhanced gripping of the hose about the connection portion.

Bulge 260 is axially longer than, and has a gentler slope than, first upset 256. A third cylindrical wall 262 extends from bulge 260 to a second upset 264. The exterior diameter of cylindrical wall 262 is reduced relative to the exterior diameters of cylindrical walls 254 and 258. A fourth cylindrical wall 266 extends from second upset 264 to open end 252. The outer diameter of cylindrical wall 266 is approximately equal to the outer diameters of walls 254 and 258. Cylindrical wall 266 is swaged slightly inwardly adjacent end 252 to provide a nose 268 which is more easily insertable into a flexible hose.

A groove 270 is defined by bulge 260, second upset 264 and third cylindrical wall 262. An annular "O" ring 272 is secured in groove 270 to enhance the seal between a flexible tube and connection portion 250. Preferably, "O" ring 272 is made of a high fluorine fluoroelastomer such as that manufactured under the trademark "Viton".

Various features of the present invention have been explained with reference to the embodiments shown and described. It must be understood, however, that modification may be made without departing from the spirit and scope of the invention. In FIG. 6, for example, tubing connection portion 250 is bent ninety degrees out of alignment from retainer housing portion 206 and seal/check valve housing portion 210. Connection portion 250 could be bent and configured as necessary to accomodate the environment in which connector body 200 is situated.

I claim:

1. A quick connector coupling for forming a joint in a fluid line system comprising:

a female connector body defining a bore, said bore extending axially inwardly into said connector body from an entrance, a radial rim being defined in said connector body adjacent said entrance, said radial rim defining an interior abutment surface;

a male member received within said bore of said connector body and having an enlarged upset portion;

a retainer disposed within said bore of said connector body and including retention legs having members which extend between said upset portion of said male member and said interior abutment surface to retain said male member within said bore; and a check valve disposed within said bore of said connector body, said check valve including a guidance sleeve fit within said bore and having a valve seat, and a plunger movable within said guidance sleeve and having a solid central portion, a hollow outer cylindrical portion extending axially outwardly from said central portion and into said guidance sleeve, a hollow inner cylindrical portion extending axially inwardly from said central portion, and a valve seal engagable with said valve seat, said plunger being movable within said guidance sleeve from a checked position, wherein said valve seat contacts said valve seal, to an unchecked position, wherein said valve seat is separated from said valve seal.

2. A coupling as claimed in claim 1 wherein said check valve further comprises a spring seated within said connector body bore which biases said plunger towards said checked position.

3. A coupling as claimed in claim 2 wherein said plunger is movable from said checked position to said unchecked position in response to inward axial movement of said male member against said plunger.

4. A coupling as claimed in claim 3 and further comprising sealing means disposed within said connector body bore, said plunger being movable from said checked position to said unchecked position only when an axially inner end of said male member has moved axially inwardly of said sealing means.

5. A coupling as claimed in claim 1 wherein said valve seal is an "O" ring having a square cross-section, said "O" ring being retained on said central portion of said plunger.

6. A coupling as claimed in claim 5 wherein said "O" ring is made of a high fluorine fluoroelastomer.

7. A coupling as claimed in claim 2 wherein a barb is formed on an exterior surface of said inner cylindrical portion of said plunger to retain said spring on said plunger.

8. A coupling as claimed in claim 1 wherein windows are formed through said outer cylindrical portion of said plunger to permit flow through said coupling when said plunger is in an unchecked position.

9. A coupling as claimed in claim 1 wherein said valve seat is a ring formed on an axially inner end of said guidance sleeve, said "O" ring being compressed against said ring to check flow through said coupling when said plunger is in a checked position.

10. A coupling as claimed in claim 1 wherein a seal is disposed in a groove formed in an exterior surface of said guidance sleeve.

11. A coupling as claimed in claim 1 wherein said connector body includes a tubing connection portion remote from said entrance configured to enhance securement of a flexible hose to said tubing connection portion of said connector body.

12. A coupling as claimed in claim 11 wherein said tubing connection portion includes a first upset spaced from an open end of said tubing connection portion, a bulge formed between said first upset and said open end, and a second upset formed between said bulge and said open end.

13. A coupling as claimed in claim 12 wherein a first cylindrical wall is formed on one side of said first upset, a second cylindrical wall is formed between said first upset and said bulge, a third cylindrical wall is formed between said bulge and said second upset, and a fourth cylindrical wall is formed between said second upset and said open end, said third cylindrical wall having a reduced exterior diameter relative to said first, second and fourth cylindrical walls.

14. A coupling as claimed in claim 13 wherein said bulge, said second upset and said third cylindrical wall define a groove which receives an annular "O" ring seal.

15. A coupling as claimed in claim 14 wherein said fourth cylindrical wall is swaged adjacent said open end to define a nose for insertion into a flexible hose.

16. A quick connector coupling for forming a joint in a fluid line system comprising:

a female connector body defining a bore, said bore extending axially inwardly into said connector body from an entrance, a radial rim being defined in said connector body adjacent said entrance, said radial rim defining an interior abutment surface;

a male member received within said bore of said connector body and having an enlarged upset portion;

a retainer disposed within said bore of said connector body and including retention legs having members which extend between said upset portion of said male member and said interior abutment surface to retain said male member within said bore;

a check valve disposed within said bore of said connector body, said check valve including a guidance sleeve fit within said bore, said guidance sleeve having a valve seat, and a plunger movable within said guidance sleeve and having a valve seal engagable with said valve seat, said plunger being movable within said guidance sleeve from a checked position, wherein said valve seat contacts said valve seal, to an unchecked position, wherein said valve seat is separated from said valve seal; and sealing means comprising two "O" ring seals secured in said bore between said guidance sleeve and a hollow spacer seated in said bore axially outwardly of said guidance sleeve, said plunger being movable from said checked position to said unchecked position only when an axially inner end of said male member has moved axially inwardly of said sealing means.

17. A quick connector coupling for forming a joint in a fluid line system comprising:

a female connector body defining a bore, said bore extending axially inwardly into said connector body from an entrance, a radial rim being defined in said connector body adjacent said entrance, said radial rim defining an interior abutment surface;

a male member received within said bore of said connector body and having an enlarged upset portion;

a retainer disposed within said bore of said connector body and including retention legs having members which extend between said upset portion of said male member and said interior abutment surface to retain said male member within said bore;

a check valve disposed within said bore of said connector body, said check valve including a guidance sleeve fit within said bore, said guidance sleeve having a valve seat, and a plunger movable within said guidance sleeve and having a valve seal engagable with said valve seat, said plunger being movable within said guidance sleeve from a checked position, wherein said valve seat contacts said valve seal, to an unchecked position, wherein said valve seat is separated from said valve seal; and sealing means comprising two "O" ring seals secured within said guidance sleeve and a hollow spacer seated within said guidance sleeve axially outwardly of said "O" ring seals, said plunger being movable from said checked position to said unchecked position only when an axially inner end of said male member has moved axially inwardly of said sealing means.

18. A coupling as claimed in claim 17 wherein said "O" ring seals and said spacer are disposed within an enlarged interior diameter portion of said guidance sleeve, and said plunger is movable within a reduced interior diameter portion of said guidance sleeve.

19. A coupling as claimed in claim 18 wherein said spacer includes an exterior annular protuberance which fits into an interior annular depression formed in said guidance sleeve to position said spacer within said guidance sleeve.

* * * * *